(12) United States Patent
Lu et al.

(10) Patent No.: US 11,453,507 B2
(45) Date of Patent: Sep. 27, 2022

(54) THRUST REVERSER COMPRESSION ROD ENGAGEMENT APPARATUS

(71) Applicant: Rohr, Inc., Chula Vista, CA (US)

(72) Inventors: Jinqiu Lu, Murrieta, CA (US); Scott L. Marshall, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 848 days.

(21) Appl. No.: 16/150,832

(22) Filed: Oct. 3, 2018

(65) Prior Publication Data
US 2020/0108941 A1    Apr. 9, 2020

(51) Int. Cl.
| | |
|---|---|
| *B64D 29/06* | (2006.01) |
| *F01D 25/26* | (2006.01) |
| *F01D 25/28* | (2006.01) |
| *F02K 1/64* | (2006.01) |
| *F02K 1/76* | (2006.01) |
| *F02K 1/80* | (2006.01) |
| *F16F 1/12* | (2006.01) |
| *F16F 15/02* | (2006.01) |

(52) U.S. Cl.
CPC .......... *B64D 29/06* (2013.01); *F01D 25/265* (2013.01); *F01D 25/28* (2013.01); *F02K 1/64* (2013.01); *F02K 1/763* (2013.01); *F02K 1/80* (2013.01); *F05D 2220/323* (2013.01); *F05D 2230/64* (2013.01); *F05D 2240/14* (2013.01); *F05D 2260/52* (2013.01); *F16F 1/128* (2013.01); *F16F 15/022* (2013.01); *F16F 2236/045* (2013.01)

(58) Field of Classification Search
CPC ....... F01D 25/265; F01D 25/28; B64D 29/06; F02K 1/763; F16F 1/128; F16F 15/022; F16F 2236/045

USPC .......................... 415/226; 267/169, 289, 291
See application file for complete search history.

(56) References Cited

U.S. PATENT DOCUMENTS

| | | | | |
|---|---|---|---|---|
| 1,072,048 | A | | 9/1913 | Simmons |
| 2,877,710 | A | * | 3/1959 | Barnhart ............... F04D 29/042 415/74 |
| 3,946,581 | A | * | 3/1976 | Weeks .................. E05B 67/365 70/32 |
| 4,121,319 | A | | 10/1978 | Welch |
| 4,266,816 | A | * | 5/1981 | Mukai ..................... E05B 79/20 292/225 |
| 4,629,146 | A | * | 12/1986 | Lymons ................. B64D 29/08 244/129.4 |
| 5,263,695 | A | * | 11/1993 | Bianchi .................... B60G 7/04 267/225 |
| 5,431,085 | A | * | 7/1995 | Geffray .................. F02K 1/766 91/44 |

(Continued)

OTHER PUBLICATIONS

EP search report for EP19201347.2 dated Feb. 27, 2020.

*Primary Examiner* — Logan M Kraft
*Assistant Examiner* — Joshua Campbell
(74) *Attorney, Agent, or Firm* — Getz Balich LLC (57) ABSTRACT

A compression rod engagement apparatus is provided that includes an engagement feature, an engagement feature pin, and a mounting member. The engagement feature is attached to the engagement feature pin. The engagement feature pin is engaged with the mounting member in a home position and axial travel of the engagement feature pin along a lengthwise axis away from the home position in either axial direction is resisted by at least one spring force.

13 Claims, 7 Drawing Sheets

(56) References Cited

U.S. PATENT DOCUMENTS

| | | | | |
|---|---|---|---|---|
| 5,915,651 A * | 6/1999 | Asaki | | F02K 1/563 |
| | | | | 239/265.29 |
| 5,915,765 A * | 6/1999 | Sternberger | | B64D 29/06 |
| | | | | 24/270 |
| 6,036,238 A * | 3/2000 | Lallament | | E05C 19/145 |
| | | | | 292/DIG. 31 |
| 8,573,928 B2 | 11/2013 | Soulier et al. | | |
| 8,615,846 B2 * | 12/2013 | Wheeler | | E05F 1/1058 |
| | | | | 16/49 |
| 9,932,855 B2 | 4/2018 | Byrne | | |
| 2005/0024815 A1 * | 2/2005 | Pratt | | B64D 29/06 |
| | | | | 361/600 |
| 2006/0284355 A1 * | 12/2006 | Miyahara | | B60T 11/16 |
| | | | | 267/169 |
| 2010/0059634 A1 * | 3/2010 | Vauchel | | B64D 29/06 |
| | | | | 292/341.16 |
| 2010/0284806 A1 * | 11/2010 | Vauchel | | B64D 29/06 |
| | | | | 415/214.1 |
| 2012/0018005 A1 * | 1/2012 | Soulier | | E05B 51/023 |
| | | | | 137/15.1 |
| 2012/0235425 A1 * | 9/2012 | Do | | E05C 1/065 |
| | | | | 292/150 |
| 2013/0234447 A1 * | 9/2013 | Gonidec | | B64D 29/06 |
| | | | | 292/129 |
| 2014/0225380 A1 * | 8/2014 | Gonidec | | B64D 29/06 |
| | | | | 292/129 |
| 2015/0191257 A1 * | 7/2015 | Marche | | F01D 25/24 |
| | | | | 415/118 |
| 2015/0308292 A1 * | 10/2015 | Forcier | | B64D 29/06 |
| | | | | 415/213.1 |
| 2016/0010502 A1 * | 1/2016 | Byrne | | F01D 25/04 |
| | | | | 267/71 |
| 2017/0211512 A1 | 7/2017 | Lu | | |

* cited by examiner

THRUST REVERSER COMPRESSION ROD ENGAGEMENT APPARATUS

BACKGROUND

1. Technical Field

The disclosure generally relates to gas turbine propulsion systems for aircraft, and more particularly to the design of compression rods used for mounting thrust reverser halves.

2. Background Information

Modern aircraft may utilize one or more gas turbine engines. A gas turbine engine may be housed in a nacelle. Often, the nacelle includes a thrust reverser. The thrust reverser includes an inner fixed structure (IFS) surrounding the engine which forms the interior surface of a bypass air duct through the thrust reverser. The IFS defines a core compartment that surrounds the engine. During various operating conditions, such as during reverse thrust, pressure in the duct is greater than the pressure in the core compartment around the engine. In these conditions, two IFS halves may be pushed together, i.e. inward toward the engine. In certain cases, this load may be reacted with a compression rod that extends between the two IFS halves.

SUMMARY

According to an aspect of the present disclosure, a compression rod engagement apparatus is provided that includes an engagement feature, an engagement feature pin, and a mounting member. The engagement feature is attached to the engagement feature pin. The engagement feature pin is engaged with the mounting member in a home position and axial travel of the engagement feature pin along a lengthwise axis away from the home position in either axial direction is resisted by at least one spring force.

In any of the aspects or embodiments described above and herein, the apparatus may include a first spring. The first spring provides the spring force that resists axial travel of the engagement feature pin along the lengthwise axis away from the home position in at least one axial direction.

In any of the aspects or embodiments described above and herein, the apparatus may include a second spring. The first spring provides the spring force that resists axial travel of the engagement feature pin along the lengthwise axis away from the home position in a first axial direction, and the second spring provides the spring force that resists axial travel of the engagement feature pin along the lengthwise axis away from the home position in a second axial direction, wherein the first axial direction is opposite the second axial direction.

In any of the aspects or embodiments described above and herein, the apparatus may further comprise a first spring and a second spring, wherein the first spring acts between the engagement feature and the mounting member, and the second spring acts between the engagement feature pin and the mounting member. At least one of the first spring or second spring provides the spring force that resists axial travel of the engagement feature pin along the lengthwise axis away from the home position.

In any of the aspects or embodiments described above and herein, the first spring may provide the spring force that resists axial travel of the engagement feature pin along the lengthwise axis away from the home position in a first axial direction, and the second spring may provide the spring force that resists axial travel of the engagement feature pin along the lengthwise axis away from the home position in a second axial direction, wherein the first axial direction is opposite the second axial direction.

In any of the aspects or embodiments described above and herein, the mounting member may include a mounting member first end, a mounting member second end opposite the mounting member first end, a first cavity open to the mounting member first end, a second cavity open to the mounting member second end, and a pin bore extending between the first cavity and the second cavity. The first spring is disposed within the first cavity, and the second spring may be disposed within the second cavity.

In any of the aspects or embodiments described above and herein, the engagement feature may include an engagement feature first end, an engagement feature second end opposite the engagement feature first end, a compression rod receiving portion post disposed at the engagement feature first end, and a post disposed at the engagement feature second end, and the post and the first cavity may be configured as a male and female couple.

In any of the aspects or embodiments described above and herein, the apparatus may include an engagement feature pin axial travel limiting element.

In any of the aspects or embodiments described above and herein, the mounting member may include an aperture configured to receive the engagement feature pin axial travel limiting element, and the engagement feature pin axial travel limiting element may be positioned to engage the engagement feature pin to limit axial travel of the engagement feature pin.

According to another aspect of the present disclosure, an aircraft nacelle is provided that includes a first nacelle structure, a second nacelle structure, and a compression rod. The first nacelle structure and the second nacelle structure are rotatable about a hinge between a closed position and an open position. The first nacelle structure includes a first compression rod engagement apparatus that includes a first mounting member, a first engagement feature, and a first engagement feature pin, wherein the first engagement feature is attached to the first engagement feature pin, and the first engagement feature pin is engaged with the first mounting member in a first home position and axial travel of the first engagement feature pin along a first lengthwise axis away from the first home position in either axial direction is resisted by at least one spring force. The compression rod has a compression rod first end and a compression rod second end, wherein in the closed position the compression rod first end is engaged with first engagement feature.

In any of the aspects or embodiments described above and herein, the first compression rod engagement apparatus may further comprise a first spring, the first spring providing the spring force that resists axial travel of the first engagement feature pin along the first lengthwise axis away from the first home position in at least one axial direction.

In any of the aspects or embodiments described above and herein, the first compression rod engagement apparatus may further comprise a second spring. The first spring may provide the spring force that resists axial travel of the first engagement feature pin along the first lengthwise axis away from the first home position in a first axial direction, and the second spring may provide the spring force that resists axial travel of the first engagement feature pin along the first lengthwise axis away from the first home position in a second axial direction, wherein the first axial direction is opposite the second axial direction.

In any of the aspects or embodiments described above and herein, the first compression rod engagement apparatus may further comprise a first spring and a second spring, wherein the first spring acts between the first engagement feature and the first mounting member, and the second spring acts between the first engagement feature pin and the first mounting member. At least one of the first spring or second spring provides the spring force that resists axial travel of the first engagement feature pin along the first lengthwise axis away from the first home position.

In any of the aspects or embodiments described above and herein, the first spring may provide the spring force that resists axial travel of the first engagement feature pin along the first lengthwise axis away from the home position in a first axial direction, and the second spring may provide the spring force that resists axial travel of the first engagement feature pin along the first lengthwise axis away from the home position in a second axial direction, wherein the first axial direction is opposite the second axial direction.

In any of the aspects or embodiments described above and herein, the mounting member may include a mounting member first end, a mounting member second end opposite the mounting member first end, a first cavity open to the mounting member first end, a second cavity open to the mounting member second end, and a pin bore extending between the first cavity and the second cavity. The first spring may be disposed within the first cavity, and the second spring may be disposed within the second cavity.

In any of the aspects or embodiments described above and herein, the first engagement feature may include an engagement feature first end, an engagement feature second end opposite the EF first end, a compression rod receiving portion disposed at the engagement feature first end, and a post disposed at the engagement feature second end, and the post and the first cavity may be configured as a male and female couple.

In any of the aspects or embodiments described above and herein, the first compression rod engagement apparatus may further comprise an engagement feature pin axial travel limiting element.

In any of the aspects or embodiments described above and herein, the second nacelle structure may include a second compression rod engagement apparatus that includes a second mounting member, a second engagement feature, and a second engagement feature pin, wherein the second engagement feature is attached to the second engagement feature pin, and the second engagement feature pin is engaged with the second mounting member in a second home position and axial travel of the second engagement feature pin along a second lengthwise axis away from the second home position in either axial direction is resisted by at least one spring force. In the closed position the compression rod second end may be engaged with second engagement feature.

In any of the aspects or embodiments described above and herein, the second compression rod engagement apparatus may further comprise a third spring, the third spring providing the spring force that resists axial travel of the second engagement feature pin along the second lengthwise axis away from the second home position in at least one axial direction.

According to another aspect of the present disclosure, a compression rod engagement apparatus is provided that includes an engagement feature, a fastener, a spring, and a mounting member. The engagement feature is attached to the mounting member, wherein the attachment permits relative axial travel between the engagement feature and the mounting member. The spring biases the engagement feature away from the mounting member into a home position.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods for a compression rod engagement apparatus for a nacelle are disclosed in accordance with various embodiments. As described above, a thrust reverser may include a duct with an inner wall that surrounds and forms a core compartment around the engine. Variations in air pressure in the duct and in the core compartment may result in forces that need to be reacted. One method of reacting these forces in use on commercial airliners today is a compression rod. The compression rod contacts engagement points on each thrust reverser half to take compression loads between them. Because the compression rod and the associated thrust reverser structure around the attachment points is basically rigid, and because the structures in the thrust reverser system are large and as a result have large tolerances, it can be difficult to make sure the compression rod ends contact the thrust reverser half engagement points at the right time when the halves are closing to generate the desired pre-load and ensure good contact. Time consuming and skill-intensive rigging using shims and other adjustment schemes is often necessary when mounting a thrust reverser on a propulsion system in order to ensure that the compression rod engagements occur as intended. This invention includes a compression rod engagement apparatus in order to better ensure the right engagement and take-up some of the engagement gap tolerance, avoiding any loose fit and rattling or vibration between the parts which could result wear in an engagement feature 60, 62 (e.g., see FIG. 5), or, in a worst case, damages break the engagement feature 60, 62 and send debris into duct.

Figure 1:
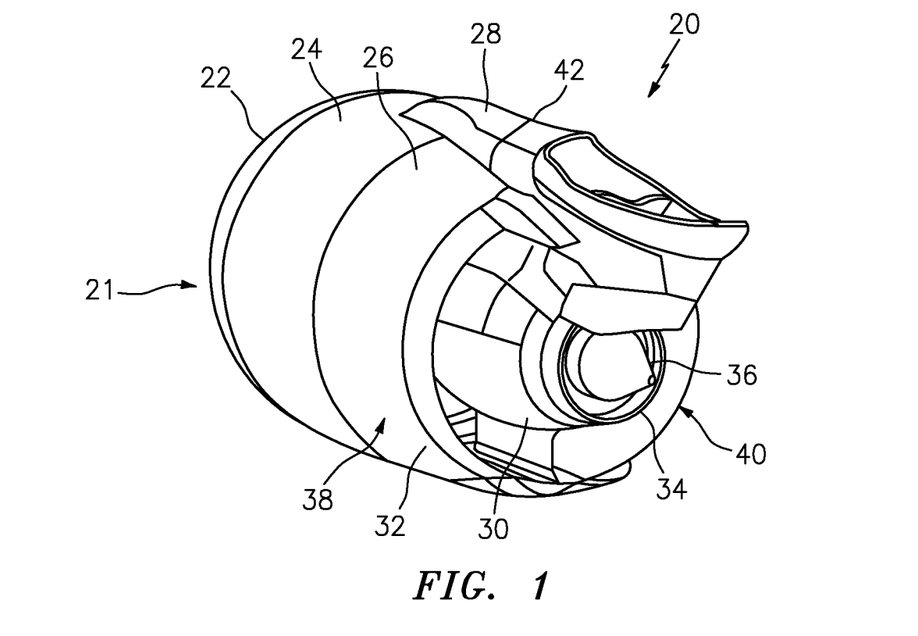
FIG. 1 illustrates a perspective view of a nacelle embodiment.

Referring to FIG. 1, a nacelle 20 for a gas turbine engine 21 is illustrated according to various embodiments. The nacelle 20 may comprise an inlet 22, a fan cowl 24, and a thrust reverser 26. The nacelle 20 may be coupled to a pylon 28, which may mount the nacelle 20 to an aircraft wing or aircraft body. Thrust reverser 26 may comprise an inner fixed structure ("IFS") 30 and an outer fixed structure ("OFS") 32. The aft portion of the IFS 30 may be constructed as a core cowl (further described below). Bypass air from an engine fan may flow between the IFS 30 and the OFS 32 in a bypass air duct, and exits the duct at a nozzle formed generally between the IFS and OFS to provide the majority of the thrust. Nozzle 34 may surround a centerbody 36, between which the engine exhaust stream exits to provide additional thrust. The thrust reverser 26 may further be split into a left half 38 and a right half 40. The left half 38 and the right half 40 may be hinged to the pylon 28 at hinges 42. The left half 38 and the right half 40 may hinge open at hinges 42 in order to provide access to the engine.

Figure 2:
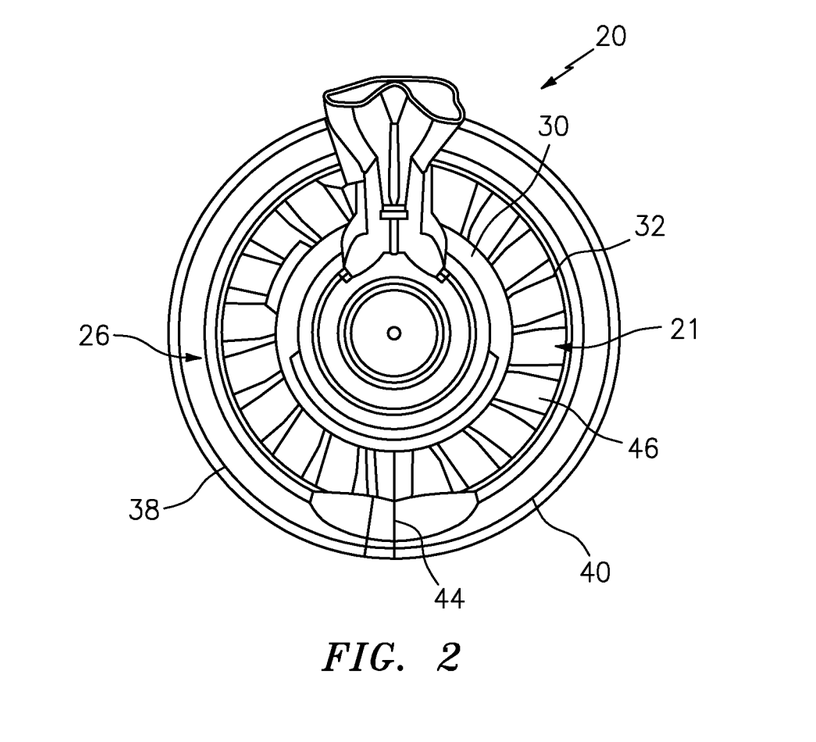
FIG. 2 illustrates an aft view of a nacelle embodiment in a closed position.

Referring to FIG. 2, an aft view of nacelle 20 in a closed position is illustrated according to various embodiments. The left and right halves 38, 40 of thrust reverser 26 may be split along split line 44. Engine fan 46 is visible through the bypass air duct.

Figure 3:
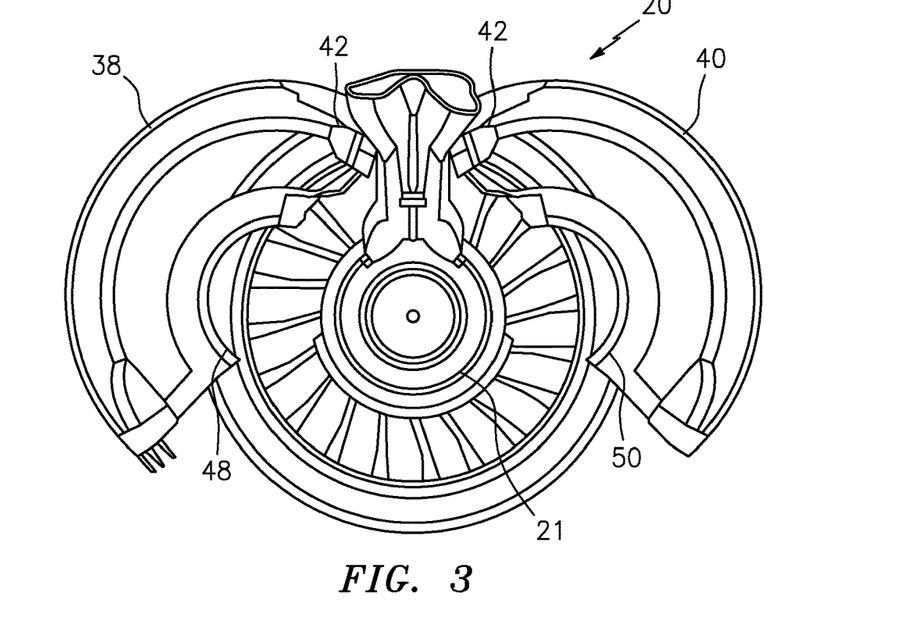
FIG. 3 illustrates an aft view of a nacelle embodiment in an open position.

Referring to FIG. 3, an aft view of nacelle 20 with the thrust reverser halves 38, 40 hinged open is illustrated according to various embodiments. The thrust reverser halves 38, 40 and core cowl halves 48, 50 are hinged open at hinges 42 in order to provide access to engine 21. The thrust reverser halves 38, 40 and core cowl halves 48, 50 may be collectively or individually referred to as "nacelle structures".

Figure 4:
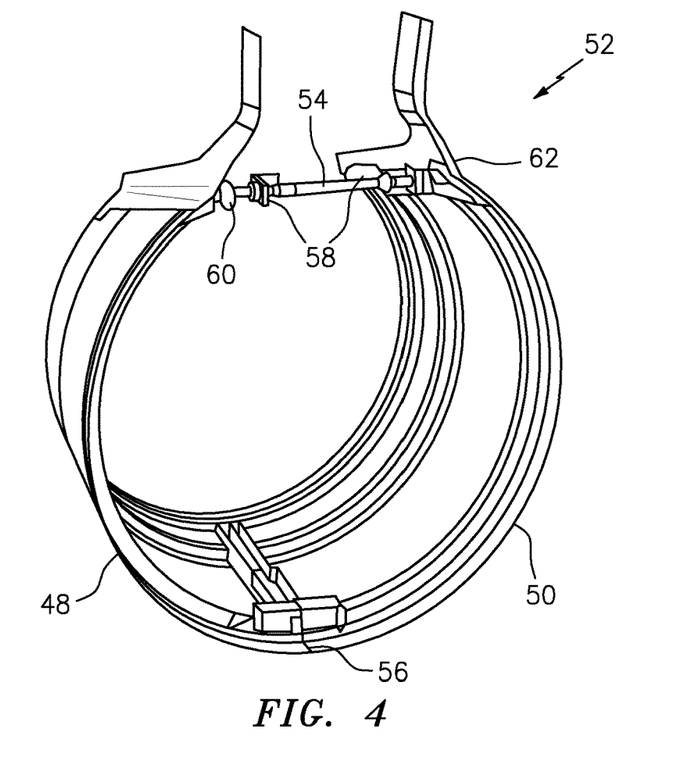
FIG. 4 illustrates a perspective view of a core cowl embodiment.

Referring to FIG. 4, a perspective view of a core cowl 52 is illustrated according to various embodiments, which shows an exemplary location where a compression rod 54 may be used. In various embodiments, one or more compression rods 54 may be located at any position in a thrust reverser and may transmit loads between halves of the thrust reverser; e.g., via one or more compression rod engagement apparatus 70. Each compression rod may be described as having a first end 55 ("CR first end 55") and a second end 57 ("CR second end 57") opposite the first end 55 (e.g., see FIG. 8). A left half 48 and a right half 50 of core cowl 52 may be split along split line 56. A compression rod 54 may be configured to transmit loads between the left half 48 and the right half 50 of the core cowl 52. The compression rod 54 may be mounted within mounting brackets (also referred to herein as pylon brackets) 58. The mounting brackets 58 may be coupled to a pylon 28 (e.g., see FIG. 1). The compression rod 54 may contact the left half 48 and the right half 50 at engagement features 60, 62. In various embodiments, the engagement features 60, 62 may be configured as engagement cones. The engagement features 60, 62 may be coupled respectively to the left half 48 and the right half 50 of the core cowl 52.

In response to the left half 48 and the right half 50 of the core cowl 52 hinging open, the compression rod 54 may disengage from the engagement features 60, 62. The compression rod 54 may be retained by mounting brackets 58. When the left half 48 and the right half 50 of the core cowl 52 are in a closed configuration, the compression rod 54 may be engaged with the engagement features 60, 62.

Figure 5:
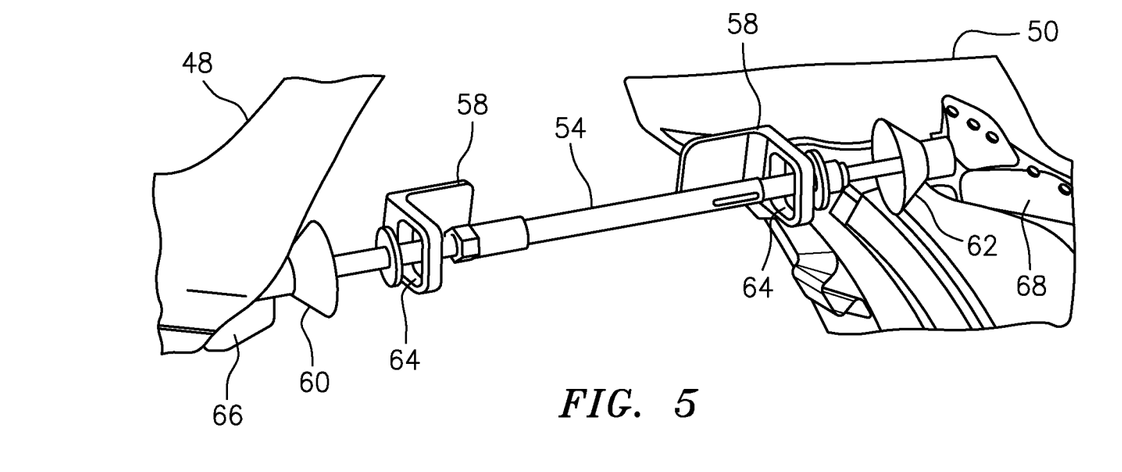
FIG. 5 illustrates a perspective view of a compression rod embodiment.

Referring to FIG. 5, a perspective view of compression rod 54 is illustrated according to various embodiments. The mounting brackets 58 may comprise apertures 64 which are larger in diameter than compression rod 54, which may allow movement of compression rod 54 within mounting brackets 58. In response to the left half 48 and the right half 50 of the core cowl 52 hinging closed, the compression rod 54 may engage the engagement features 60, 62. A first mounting member 66 may be attached to left half 48 of the core cowl 52. The engagement feature 60 may be coupled to the first mounting member 66. A second mounting member 68 may be attached to the right half 50 of the core cowl 52. The engagement feature 62 may be coupled to second mounting member 68.

Figure 6:
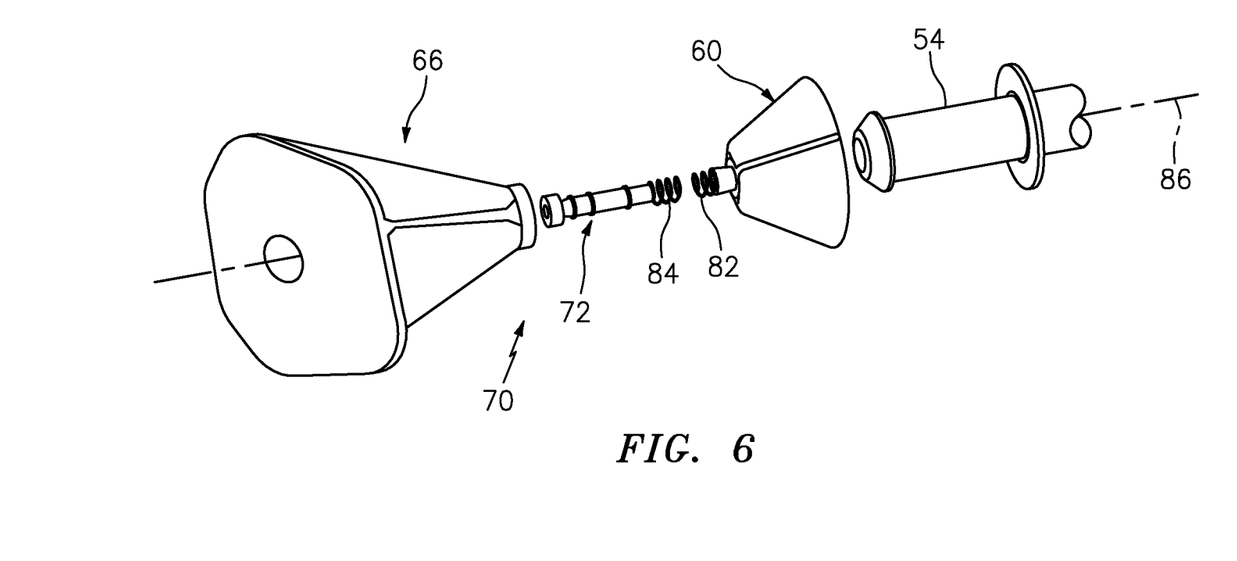
FIG. 6 is an exploded view of a compression rod engagement apparatus embodiment.
Figure 7:
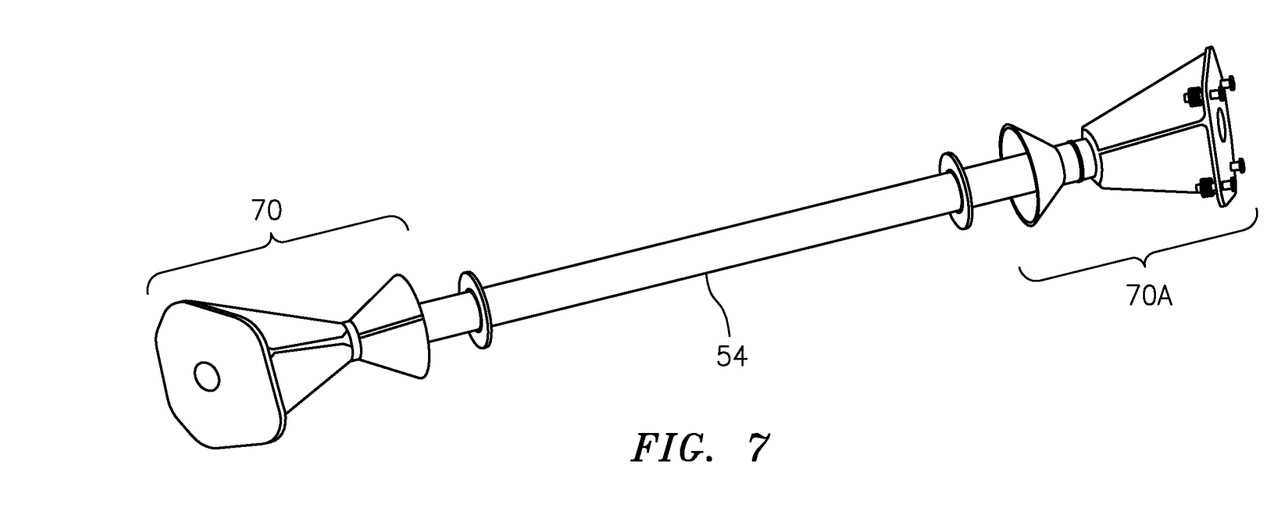
FIG. 7 is a perspective view of compression rod with compression rod engagement apparatus embodiments disposed at opposite ends of the compression rod.
Figure 8:
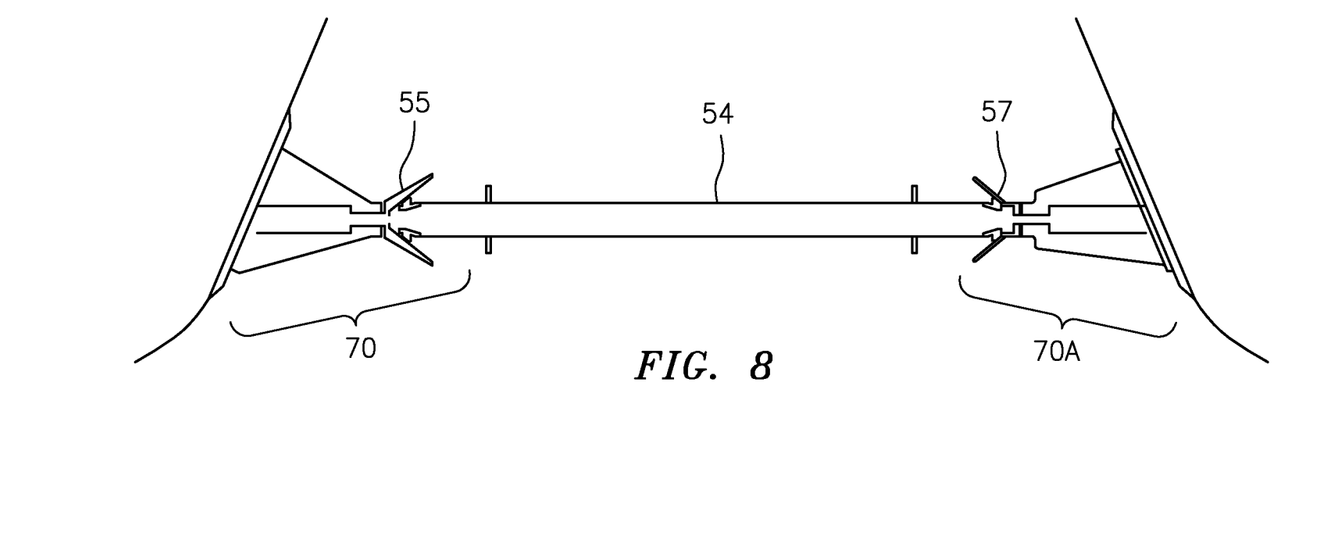
FIG. 8 is a diagrammatic sectional view of compression rod with compression rod engagement apparatus embodiments disposed at opposite ends of the compression rod.

Referring to FIGS. 6-8, a compression rod engagement apparatus 70 for a nacelle 20 is illustrated with only a portion of compression rod 54 shown, in accordance with various embodiments. According to the present disclosure, an aircraft nacelle 20 may include a compression rod 54 configured to engage a compression rod engagement apparatus 70 at one end or both ends of the compression rod 54. For ease of description, the compression rod engagement apparatus 70 is described below in terms of structure for engaging and cooperating with a first end of a compression rod 54. The present disclosure contemplates that the compression rod engagement apparatus 70 may further include a structure for engaging and cooperating with the second end of the compression rod 54; e.g., a structure that is similar to or identical to the structure described below for engaging the first end of the compression rod 54; e.g., FIGS. 7 and 8 illustrate a pair of like compression rod engagement apparatus 70, 70A disposed to engage opposite ends of the compression rod 54.

Figure 9:
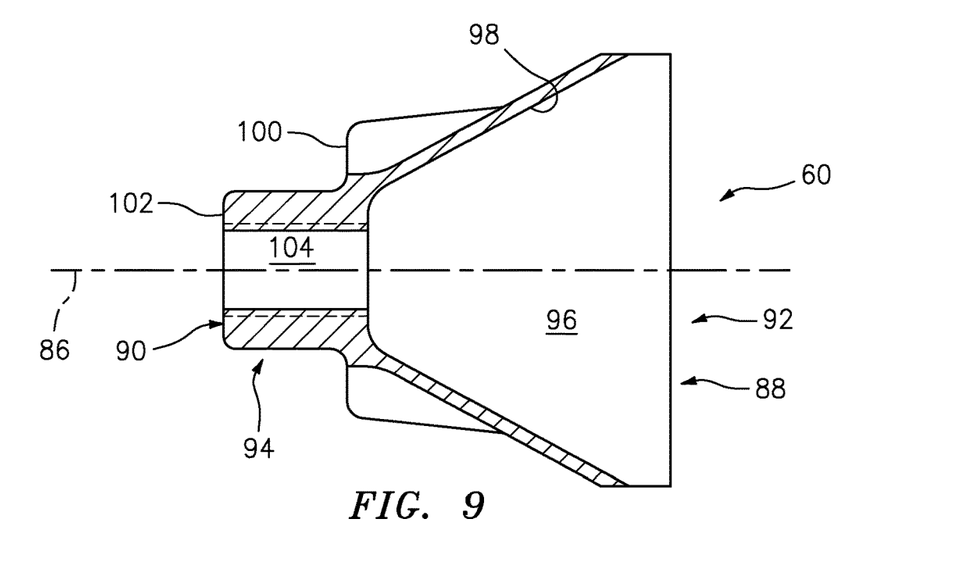
FIG. 9 is a diagrammatic sectional view of an engagement feature embodiment.

In some embodiments, the compression rod engagement apparatus 70 may include an engagement feature 60, an engagement feature pin ("EF pin") 72, a first spring 82, a second spring 84, and a mounting member (e.g., first mounting member 66), and may be described as extending along a lengthwise axis 86. The engagement feature 60 may be referred to as and/or comprise a bumper cup. Referring to FIG. 9, the engagement feature 60 includes a first end 88 ("EF first end 88"), a distal second end 90 ("EF second end 90"), a compression rod receiving portion 92, and a post 94. The compression rod receiving portion 92 has an interior pocket 96. The interior pocket 96, which is open at the first end 88, is defined by an interior surface 98 and is configured to receive (e.g., be engaged with) a portion of the compression rod 54 (e.g., see FIGS. 12 and 13). In the non-limiting embodiment shown in FIG. 9, the interior pocket 96 has a partial-conical configuration. The engagement feature 60 includes a shoulder surface 100 located at the second end 90. The post 94 extends along the lengthwise axis 86, outwardly from the second end 90 of the engagement feature 60 (e.g., outwardly from the shoulder surface 100), and has an end surface 102. In the non-limiting embodiment shown in FIG. 9, a threaded aperture 104 is disposed within the post 94, extending along the lengthwise axis 86. Also in the non-limiting embodiment shown in FIG. 9, the post 94 has a cylindrical configuration. The present disclosure is not limited to an engagement feature 60 having a cylindrical post 94. As will be explained below, the first mounting member 66 has a first cavity 106 that is configured to receive the post 94, and the post 94 may be any configuration that is receivable within the first cavity 106; e.g., a mating configuration between the post 94 of the engagement feature 60 and the first cavity 106 of the first mounting member 66.

The first mounting member 66 includes a first end 108 ("MM first end 108") and a distal second end 110 ("MM second end 110"), a first cavity 106, a second cavity 112, an engagement feature pin bore ("EF pin bore") 114, and a first end surface 116. The first cavity 106 is disposed inwardly from the first end 108, and has a base surface 118. The second cavity 112 is disposed inwardly from the second end 110, and has a base surface 120. The first and second cavities 106, 112 and the EF pin bore 114 are aligned along the lengthwise extending axis 86. The EF pin bore 114 is disposed between and connects the first cavity 106 to the second cavity 112. The first cavity 106 may be cylindrically configured with a diameter ($D_{FC}$), and the second cavity 112 may be cylindrically configured with a diameter ($D_{SC}$). The EF pin bore 114 may be cylindrically configured with a diameter ($D_{PB}$). In the embodiment shown in FIG. 9, the EF pin bore diameter is less that the first cavity diameter, and the first cavity diameter is less than the second cavity diameter; e.g., $D_{PB} < D_{FC} < D_{SC}$. The present disclosure is not limited to this configuration. For example, the first cavity diameter may equal the second cavity diameter, etc. Moreover, the first and second cavities 106, 112 and the EF pin bore 114 may not be cylindrical, etc. As will be explained below, the EF pin bore 114 is configured to receive the EF pin 72 and allow the EF pin 72 to extend between the first cavity 106 and the second cavity 112.

Figure 10:
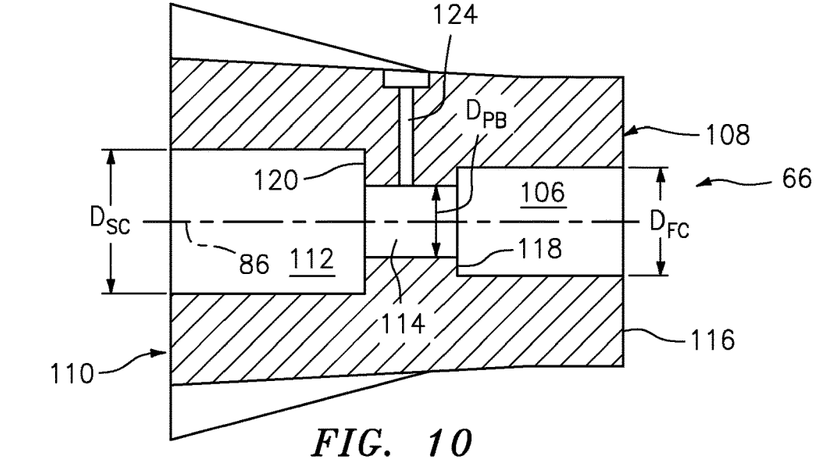
FIG. 10 is a diagrammatic sectional view of a mounting member embodiment.
Figure 11:
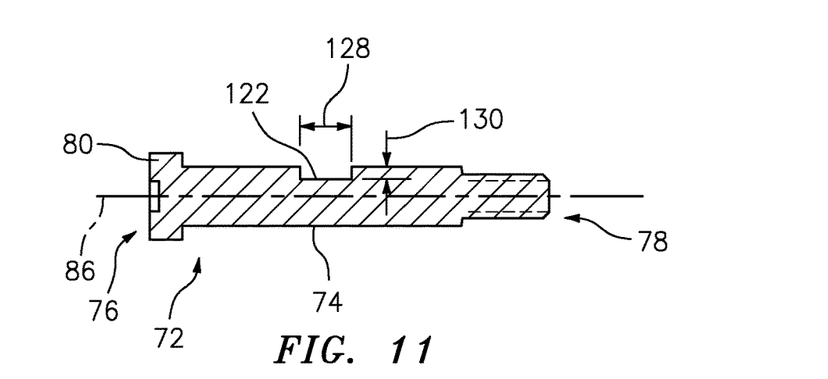
FIG. 11 is a diagrammatic sectional view of an engagement feature pin embodiment.

The EF pin 72 has body 74 that extends between a head end 76 and an opposite engagement feature end 78 (see FIG. 11). In the embodiment shown in FIGS. 9-11, a portion of the body 74 contiguous with the engagement feature end 78 is threaded to permit threaded engagement with the engagement feature 60. The EF pin 72 is not limited to threaded engagement with the engagement feature 60, and may be attached thereto by other means. In the embodiment shown in FIGS. 9-11, the EF pin 72 includes a head 80 disposed at the head end 76 that has a larger diameter than the body 74. As will be explained below, the head 80 is configured to retain the second spring 84. Hence, the EF pin 72 may have any configuration that is operable to retain the second spring 84.

In some embodiments, the compression rod engagement apparatus 70 may be configured to limit the travel of the EF pin 72 along the lengthwise extending axis 86. For example, in the embodiment shown in FIGS. 10-13, the EF pin 72 includes a slot 122 disposed in the exterior surface of the pin body 74, and the first mounting member 66 has an aperture 124 for receiving an element 126 (e.g., a set screw, a pin, etc.; see FIGS. 12 and 13) that can be positioned to extend into the slot 122. The slot 122 has an axial length 128 and a depth 130. As will be explained below, when the compression rod engagement apparatus 70 is assembled, the aperture 124 is positioned to align with the slot 122 and a portion of the element 126 extends into the slot 122. The axial length 128 of the slot 122 permits a predetermined amount of lengthwise travel by the EF pin 72. The combination of the slot 122 and the element 126 extending into the slot 122 can be used to retain the EF pin 72 within the compression rod engagement apparatus 70.

The first spring 82 is configured to produce a biasing force upon being axially compressed. A non-limiting example of a first spring 82 is a helical spring having a first spring rate. The second spring 84 is configured to produce a biasing force upon being axially compressed. A non-limiting example of a second spring 84 is a helical spring having a second spring rate. The first spring rate may be greater, lesser or equal to the second spring rate.

Figure 12:
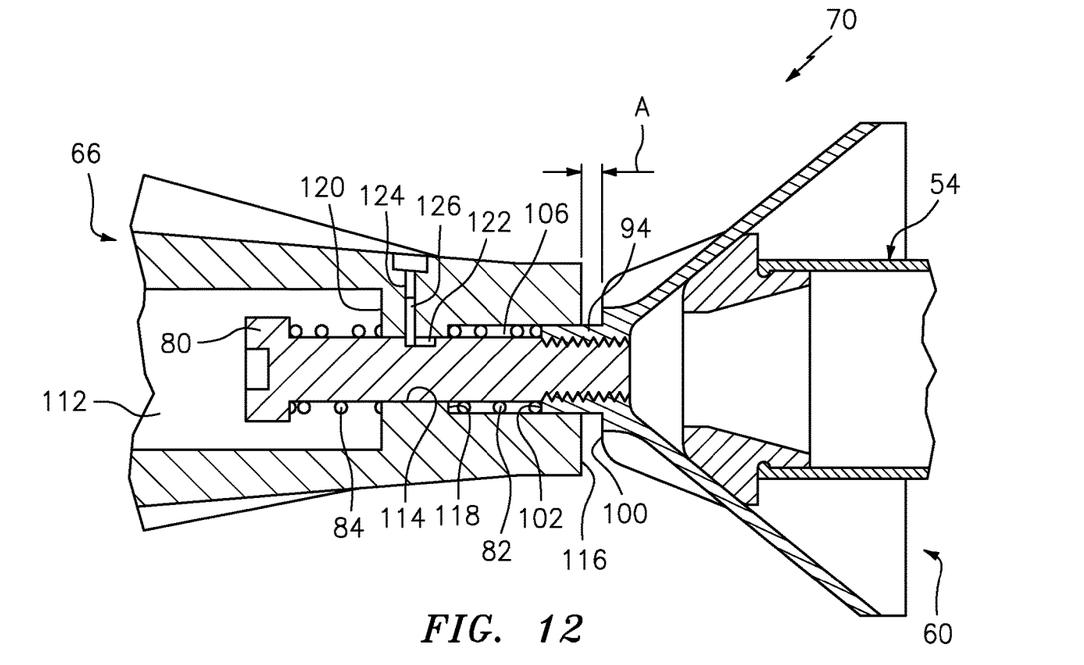
FIG. 12 is a diagrammatic sectional view of a compression rod engagement apparatus embodiment shown in assembled form.
Figure 13:
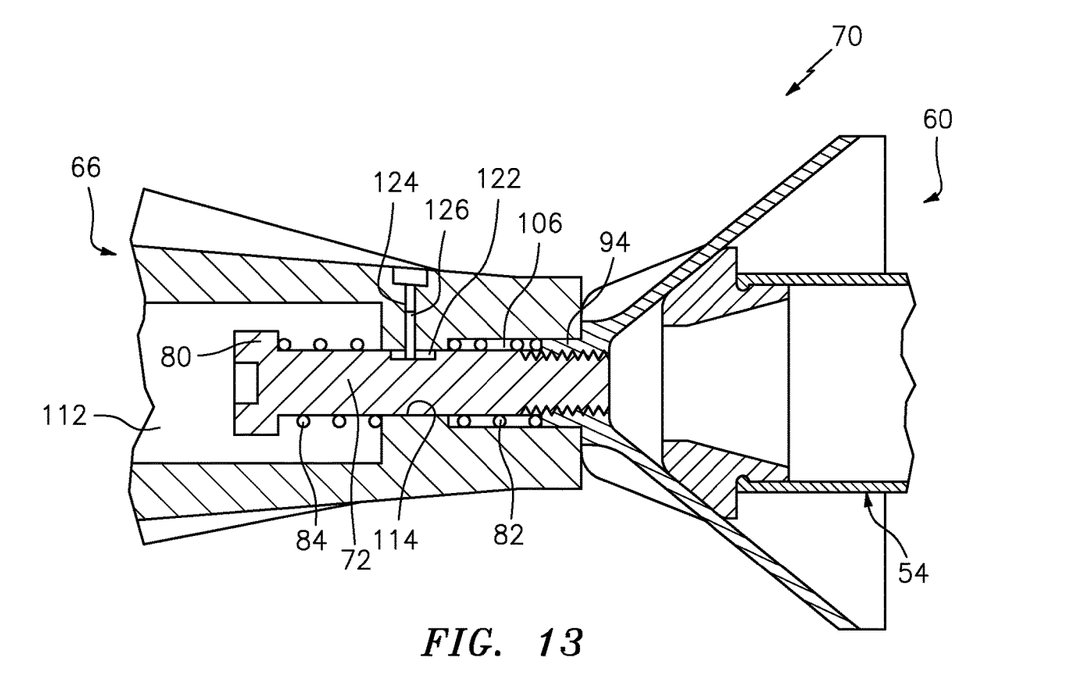
FIG. 13 is a diagrammatic sectional view of a compression rod engagement apparatus embodiment shown in assembled form.

FIGS. 12 and 13 are diagrammatic sectional views of a compression rod engagement apparatus 70 embodiment shown in assembled form. The EF pin 72 extends between the first and second cavities 106, 112 of the first mounting member 66 (through the EF pin bore 114). The head 80 of the EF pin 72 is disposed within the second cavity 112 of the first mounting member 66. At least a portion of the threaded portion of the EF pin 72 is disposed in threaded engagement with the post 94 of the engagement feature 60. The first spring 82 is disposed within the first cavity 106 of the first mounting member 66, and a portion of the body 74 of the EF pin 72 extends through the center of the first spring 82. The first spring 82 extends between and acts upon the end surface 102 of the post 94 and the base surface 118 of the first cavity 106 of the first mounting member 66. The second spring 84 is disposed within the second cavity 112 of the first mounting member 66, and a portion of the body 74 of the EF pin 72 extends through the center of the second spring 84. The second spring 84 extends between and acts upon the head 80 of the EF pin 72 and the base surface 120 of the second cavity 112 of the first mounting member 66.

The biasing force of the first spring 82 biases the engagement feature 60 towards the compression rod 54 (e.g., to the right in FIG. 12), away from the first mounting member 66, and the biasing force of the second spring 84 biases the engagement feature 60 toward the first mounting member 66 (e.g., to the left in FIG. 12, away from the compression rod 54). The first and second springs 82, 84 acting against one another in this manner prevents the compression rod engagement apparatus 70 from rattling around, and may keep the compression rod engagement apparatus 70 in contact with the compression rod 54.

In FIG. 12, the biasing force produced by the first spring 82 may be greater than the biasing force produced by the second spring 84, and the compression rod 54 is not applying any appreciable force to the engagement feature 60. A separation distance "A" can be seen disposed between the shoulder surface 100 of the engagement member 60 and the first end surface 116 of the first mounting member 66. In the configuration shown in FIG. 12, the EF pin 72 may be described as residing in a "home" position dictated by the offsetting spring forces of the first and second springs 82, 84. In the home position, the EF pin 72 is biased. In the home position, the EF pin 72 may move slightly, but the springs 82, 84 substantially mitigate or prevent vibration or rattling of the EF pin 72. As stated above, the present disclosure is not limited to an embodiment wherein the biasing force produced by one spring is greater than the biasing force produced by the other; e.g., the first and second springs 82, 84 may be configured to equal one another. In FIG. 13, the first spring 82 is compressed to some degree as a result of force being transmitted to the compression rod engagement apparatus 70 by the compression rod 54 acting on the engagement feature 60. As a result, the engagement feature 60 and the EF pin 72 shift axially to the left as shown in FIG. 13, thereby moving a greater amount of the EF pin 72 into the second cavity 112 of the first mounting member 66. The first spring 82, therefore, resists the force to the engagement feature 60 by the compression rod 54. In FIG. 13, the shoulder surface 100 of the engagement feature 60 is in contact with the first end surface 116 of the first mounting member 60; e.g., the maximum amount of travel for the engagement feature—where the separation distance "A" equals zero.

In those embodiments wherein the compression rod engagement apparatus 70 is configured to limit the travel of the EF pin 72 along the lengthwise extending axis 86, the axial length 128 of the slot 122 may be chosen to accommodate the lengthwise axial travel of the EF pin 72. For example, the slot 122 and element 126 may be configured to limit the travel of the EF pin 72 (and attached engagement feature 60) in the direction of the compression rod 54, and also be configured (in regards to axial travel in the opposite direction) to allow the shoulder surface 100 of the engagement feature 60 to contact the first end surface 116 of the first mounting member 66; e.g., to prevent the element 126 engaged with the slot 122 from experiencing a significant shearing load.

Figure 14:
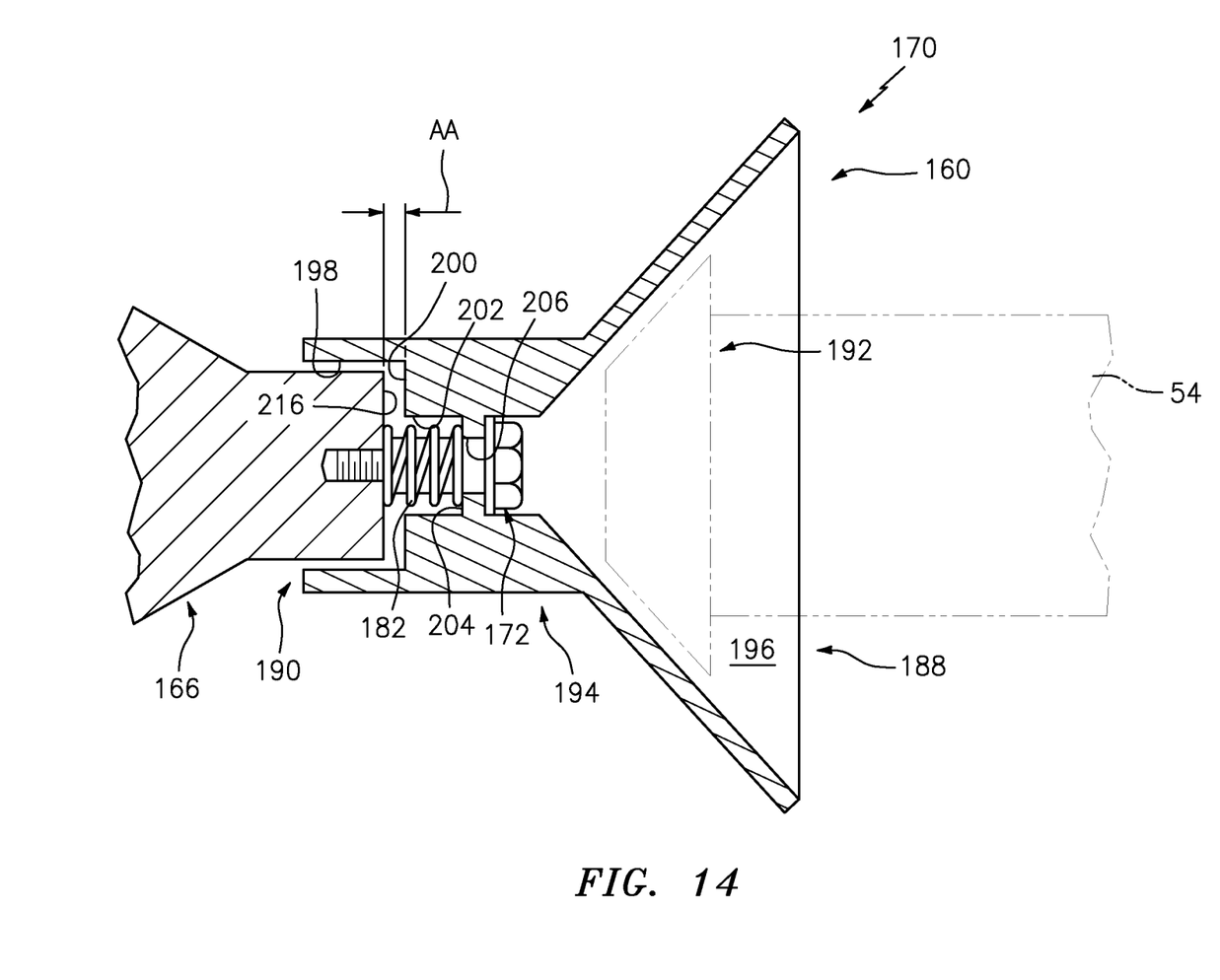
FIG. 14 is a diagrammatic sectional view of an arrangement a compression rod engagement apparatus embodiment shown in assembled form.

Referring to FIG. 14, another compression rod engagement apparatus 170 is shown having a mounting member 166, an engagement feature 160, a spring 182, and a fastener 172. The engagement feature 160 includes a first end 188 and a distal second end 190. The engagement feature 160 further includes a compression rod receiving portion 192 with an interior pocket 196, open at the first end 188, and a post 194 disposed at the second end 190. A mounting member cavity 198 is disposed in the post 194. The mounting member cavity 198 includes a base surface 200. A spring cavity 202 is disposed axially inwardly from the mounting member cavity 198. The spring cavity 202 includes a base surface 204. A fastener cavity 206 extends between the spring cavity 202 and the interior pocket 196. The mounting member 166 has an end surface 216. As shown in FIG. 14, the engagement feature 160 and the mounting member 166 form a mating male and female relationship. The present disclosure is not limited to this particular configuration; e.g., in an alternative embodiment, the engagement feature may be configured as the male feature and the mounting member may be configured as the female feature, etc.

The biasing force of the spring 182 biases the engagement feature 160 towards the compression rod 54 (e.g., to the right in FIG. 14), away from the first mounting member 166. The spring 182 acting in this manner prevents the compression rod engagement apparatus 170 from rattling around, and may keep the compression rod engagement apparatus 170 in contact with the compression rod 54. In FIG. 14, the compression rod 54 is not applying any appreciable force to the engagement feature 160. A separation distance "AA" can be seen disposed between the base surface 200 of the mounting member cavity 198 and the end surface 216 of the mounting member 16. The spring 182 may be compressed to some degree as a result of force being transmitted to the compression rod engagement apparatus 170 by the compression rod 54 acting on the engagement feature 160. As a result, the engagement feature 160 may shift axially to the left as shown in FIG. 14. The spring 182, therefore, resists the force applied to the engagement feature 160 by the compression rod 54.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft nacelle comprising:
   a first nacelle structure and a second nacelle structure, wherein the first nacelle structure and the second nacelle structure are rotatable about a hinge between a closed position and an open position;
   wherein the first nacelle structure includes a first compression rod engagement apparatus extending along a lengthwise axis, the first compression rod engagement apparatus comprising:
      an engagement feature;
      an engagement feature pin disposed about the lengthwise axis, the engagement feature pin including an engagement feature end mounted to the engagement feature and a head end disposed axially opposite the engagement feature end;
      a mounting member surrounding the engagement feature pin, the mounting member defining an engagement feature pin bore, wherein the engagement feature pin is configured for axial travel within the engagement feature pin bore along the lengthwise axis; and
      a first spring and a second spring, each of the first spring and the second spring disposed about the lengthwise axis, wherein the first spring acts between the engagement feature and the mounting member, and the second spring acts between the engagement feature pin and the mounting member; and
   a compression rod having a CR first end and a CR second end, wherein in the closed position the CR first end is engaged with the engagement feature;
   wherein the engagement feature pin is engaged with the mounting member in a home position and axial travel of the engagement feature pin along the lengthwise axis away from the home position in either axial direction is resisted by at least one spring force; and
   wherein at least one of the first spring or second spring provides the spring force that resists axial travel of the engagement feature pin along the lengthwise axis away from the home position.

2. The nacelle of claim 1, wherein the first spring provides the spring force that resists axial travel of the engagement feature pin along the lengthwise axis away from the home position in a first axial direction, and the second spring provides the spring force that resists axial travel of the engagement feature pin along the lengthwise axis away from the home position in a second axial direction, wherein the first axial direction is opposite the second axial direction.

3. The nacelle of claim 2, wherein the mounting member includes a MM first end, a MM second end opposite the MM first end, a first cavity open to the MM first end, a second cavity open to the MM second end, and a pin bore extending between the first cavity and the second cavity;
   wherein the first spring is disposed within the first cavity, and the second spring is disposed within the second cavity.

4. The nacelle of claim 3, wherein the engagement feature includes a EF first end, an EF second end opposite the EF first end, a compression rod receiving portion post disposed at the EF first end, and a post disposed at the EF second end;
   wherein the post and the first cavity are configured as a male and female couple.

5. The nacelle of claim 1, further comprising an engagement feature pin axial travel limiting element.

6. The nacelle of claim 5, wherein the mounting member includes an aperture configured to receive the engagement feature pin axial travel limiting element; and
   wherein the engagement feature pin axial travel limiting element is positioned to engage the engagement feature pin to limit axial travel of the engagement feature pin.

7. The nacelle of claim 1, wherein the first spring is mounted to and axially compressed between the engagement feature and the mounting member and wherein the second spring is mounted to and axially compressed between engagement feature pin and the mounting member.

8. The nacelle of claim 1, wherein the first spring and the second spring are located within the mounting member and wherein the first spring is located on a first axial side of the engagement feature pin bore and the second spring is located on a second axial side of the engagement feature pin bore axially opposite the first axial side.

9. An aircraft nacelle comprising:
   a first nacelle structure and a second nacelle structure, wherein the first nacelle structure and the second nacelle structure are rotatable about a hinge between a closed position and an open position;
   wherein the first nacelle structure includes a first compression rod engagement apparatus extending along a first lengthwise axis, the first compression rod engagement apparatus includes a first mounting member defining a first engagement feature pin bore, a first engagement feature positioned axially adjacent the first mounting member and configured for axial travel relative to the first mounting member, and a first engagement feature pin configured for axial travel within the first engagement feature pin bore along the first lengthwise axis, wherein the first engagement feature is attached to the first engagement feature pin, and the first engagement feature pin is engaged with the first mounting member in a first home position and axial travel of the first engagement feature pin along the first lengthwise axis away from the first home position in either axial direction is resisted by at least one spring force;
   wherein the second nacelle structure includes a second compression rod engagement apparatus extending along a second lengthwise axis, the second compression rod engagement apparatus includes a second mounting member defining a second engagement feature pin bore, a second engagement feature positioned axially adjacent the second mounting member and configured for axial travel relative to the second mounting member, and a second engagement feature pin configured for axial travel within the second engagement feature pin bore along the second lengthwise axis, wherein the second engagement feature is attached to the second engagement feature pin, and the second engagement feature pin is engaged with the second mounting member in a second home position and axial travel of the second engagement feature pin along the second lengthwise axis away from the second home position in either axial direction is resisted by at least one spring force; and
   a compression rod having a CR first end and a CR second end, wherein in the closed position the CR first end is engaged with first engagement feature and the CR second end is engaged with the second engagement feature;
   wherein the first compression rod engagement apparatus further comprises a first spring and a second spring, wherein the first spring acts between the first engagement feature and the first mounting member, and the second spring acts between the first engagement feature pin and the first mounting member;
wherein at least one of the first spring or second spring provides the spring force that resists axial travel of the first engagement feature pin along the first lengthwise axis away from the first home position;
wherein the second compression rod engagement apparatus further comprises a third spring, the third spring providing the spring force that resists axial travel of the second engagement feature pin along the second lengthwise axis away from the second home position in at least one axial direction.

10. The nacelle of claim 9, wherein the first spring provides the spring force that resists axial travel of the first engagement feature pin along the first lengthwise axis away from the first home position in a first axial direction, and the second spring provides the spring force that resists axial travel of the first engagement feature pin along the first lengthwise axis away from the first home position in a second axial direction, wherein the first axial direction is opposite the second axial direction.

11. The nacelle of claim 10, wherein the mounting member includes a MM first end, a MM second end opposite the MM first end, a first cavity open to the MM first end, a second cavity open to the MM second end, and a pin bore extending between the first cavity and the second cavity;
wherein the first spring is disposed within the first cavity, and the second spring is disposed within the second cavity.

12. The nacelle of claim 11, wherein the first engagement feature includes a EF first end, an EF second end opposite the EF first end, a compression rod receiving portion disposed at the EF first end, and a post disposed at the EF second end;
wherein the post and the first cavity are configured as a male and female couple.

13. The nacelle of claim 9, wherein the first compression rod engagement apparatus further comprises an engagement feature pin axial travel limiting element.

\* \* \* \* \*